(12) United States Patent
Messina et al.

(10) Patent No.: US 8,840,980 B2
(45) Date of Patent: Sep. 23, 2014

(54) STIFFENED STRUCTURE INTEGRATING AN OPENING

(75) Inventors: Paolo Messina, Toulouse (FR); Gerard Coudouent, Fontenilles (FR); Pierre Larroumets, Toulouse (FR); Arnaud Tonnele, Mas-Grenier (FR)

(73) Assignee: Airbus Operations SAS, Toulouse (FR)

(*) Notice: Subject to any disclaimer, the term of this patent is extended or adjusted under 35 U.S.C. 154(b) by 167 days.

(21) Appl. No.: 13/362,109

(22) Filed: Jan. 31, 2012

(65) Prior Publication Data

US 2012/0196080 A1 Aug. 2, 2012

(30) Foreign Application Priority Data

Jan. 31, 2011 (FR) ...................................... 11 50723

(51) Int. Cl.
- *B32B 3/24* (2006.01)
- *B64C 1/08* (2006.01)
- *B64C 3/22* (2006.01)
- *B32B 3/26* (2006.01)

(52) U.S. Cl.
CPC . *B64C 1/08* (2013.01); *B32B 3/266* (2013.01); *B64C 3/22* (2013.01)
USPC ............ 428/131; 428/113; 428/116; 244/119

(58) Field of Classification Search
CPC .................................. B64C 3/22; B32B 3/266
USPC ........................... 428/131, 113, 116; 244/119
See application file for complete search history.

(56) References Cited

U.S. PATENT DOCUMENTS

| 4,230,293 A | 10/1980 | Hamm et al. |
| 5,069,586 A * | 12/1991 | Casey ........................... 411/339 |
| 5,262,220 A | 11/1993 | Spriggs et al. |

FOREIGN PATENT DOCUMENTS

| GB | 555 496 | 8/1943 |
| WO | 2011030079 | 3/2011 |

OTHER PUBLICATIONS

French Search Report dated Oct. 5, 2011, corresponding to the Foreign Priority Application No. 11 50723.

* cited by examiner

*Primary Examiner* — William P Watkins, III
(74) *Attorney, Agent, or Firm* — Young & Thompson

(57) ABSTRACT

A stiffened structure includes stiffeners (14.1, 14.2, 14.3) and nodes (12) at which three stiffeners (14.1, 14.2, 14.3) of different directions intersect, with the surfaces of the stiffeners (14.1, 14.2, 14.3) being arranged in planes that are perpendicular to the same plane, whereby the stiffened structure includes at least one opening (26) and is characterized in that the opening (26) is surrounded by a hexagonal belt, formed by peripheral stiffeners (40).

18 Claims, 4 Drawing Sheets

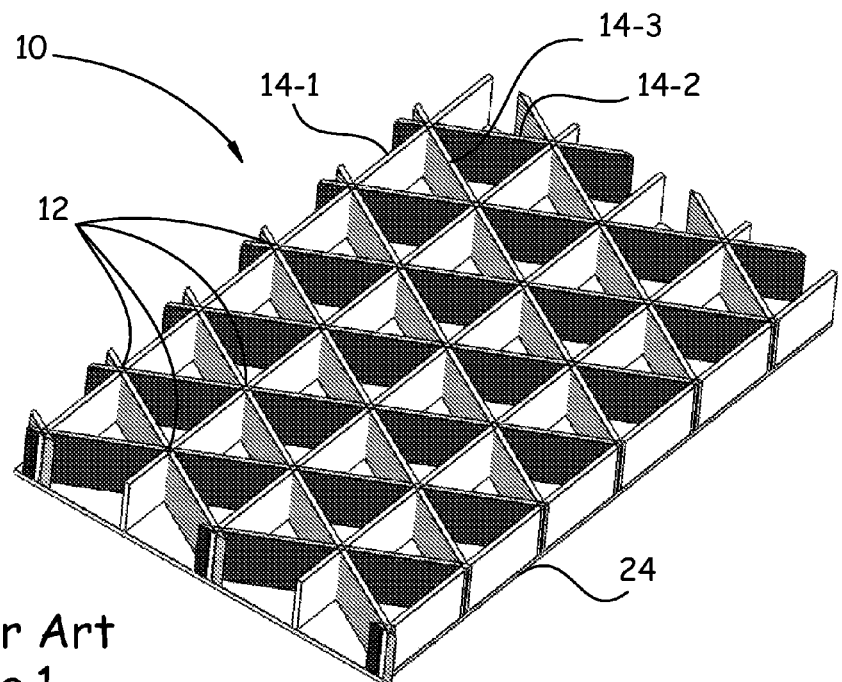
Prior Art
Fig.1
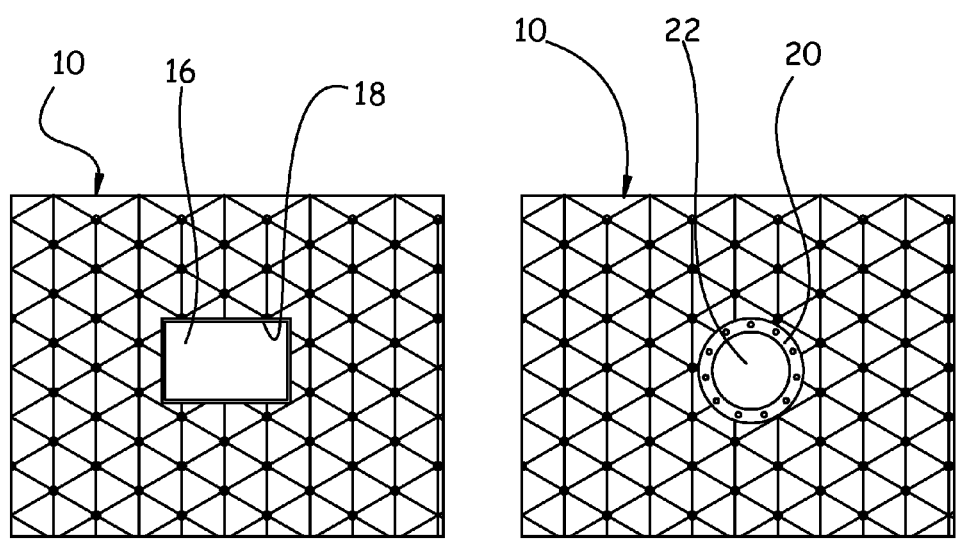
Prior Art
Fig.2A
Prior Art
Fig.2B

STIFFENED STRUCTURE INTEGRATING AN OPENING

BACKGROUND OF THE INVENTION

This invention relates to a stiffened structure that integrates an opening. An aircraft comprises numerous stiffened structures.

DESCRIPTION OF THE RELATED ART

Thus, stiffened structures that comprise a first series of stiffeners that are oriented in a first direction, for example the longitudinal direction of the aircraft, and a second series of stiffeners that are oriented in a second direction that is perpendicular to the first are known. In this case, the zone that is delimited by the stiffeners, also called a pocket or mesh, has a square or rectangular shape.

Stiffened structures that comprise three series of stiffeners that are oriented in directions at 60° are also known. These structures have an isotropic behavior that imparts to them desired mechanical characteristics. Thus, the Patent Application FR-2009/0056286 proposes a sizing process by an analytical method of such structures.

According to a first embodiment that is illustrated in FIG. 1, the stiffened structure 10 comprises nodes 12 at which three stiffeners 14.1, 14.2, 14.3 of different directions intersect. Advantageously, the stiffeners are oriented in three directions that form an angle of 60° between them. In this case, all of the meshes have the shape of an isosceles triangle. This structure is also known under the name of "Isogrid."

According to another embodiment, the structure comprises nodes at which only two stiffeners of different directions intersect. In this case, the structure comprises triangular meshes and other hexagonal meshes. It is known under the name of "Anisogrid."

The "Isogrid"-type structure offers better mechanical characteristics, in particular in terms of buckling, with meshes of hexagonal shapes of an "Anisogrid"-type structure producing a less favorable stability and having a tendency to reduce the buckling resistance of the structure.

So-called "Isogrid" or "Anisogrid" metal structures are used in the production of aircraft.

SUMMARY OF THE INVENTION

The invention relates more particularly to stiffened "Isogrid"-type structures.

According to one application, a stiffened structure can be associated with a panel. In this case, the stiffened structure is fixed against one surface of a panel.

According to another application, the stiffened structure can be used by itself. In this case, the space between the stiffeners is not blocked by a panel.

In some cases, a pipe that is essentially parallel to the plane of the stiffeners should pass through these stiffened structures. When this pipe has a smaller diameter than a mesh and it is not to be connected to the stiffened structure, this does not pose any problem. In the same manner, when the panel that is associated with the stiffened structure comprises an opening whose diameter is smaller than the mesh, this does not pose any problem.

This becomes more problematic when the pipe (or the opening) has a cross-section that is larger than the mesh and/or when it is to be connected to the structure.

As illustrated in FIG. 2A, when a rectangular opening 16 is made in the stiffened structure 10, the latter comprises a peripheral stiffener 18 that is rectangular in shape and is connected to the stiffeners of the stiffened structure. These forms of openings and peripheral stiffeners are not adapted for a stiffened structure because they greatly impact its mechanical characteristics.

As illustrated in FIG. 2B, when a pipe passes through the stiffened structure 10 or is connected to the stiffened structure, a stiffener or a circular, peripheral ring 20 that is connected to the stiffeners of the stiffened structure and that comprises an opening 22 is provided. This approach makes it possible to obtain better integration compared to the approach that can be seen in FIG. 2A.

The purpose of this approach is to improve this integration by limiting the impact of an opening in an "Isogrid"-type stiffened structure.

For this purpose, the invention has as its object a stiffened structure that comprises stiffeners and nodes at which three stiffeners of different directions intersect, with the surfaces of the stiffeners being arranged in planes that are perpendicular to the same plane, whereby said stiffened structure comprises at least one opening and is characterized in that said opening is surrounded by a hexagonal belt formed by peripheral stiffeners.

BRIEF DESCRIPTION OF THE DRAWINGS

Other characteristics and advantages will emerge from the following description of the invention, a description that is provided only by way of example, relative to the accompanying drawings in which:

FIG. 1 is a perspective view of an "Isogrid"-type stiffened structure,

FIG. 2A is a front view of an "Isogrid"-type stiffened structure with an opening according to the prior art, FIG. 2B is a front view of an "Isogrid"-type stiffened structure with an attachment ring of a pipe according to the prior art.

DETAILED DESCRIPTION OF THE INVENTION

Figure 3A:
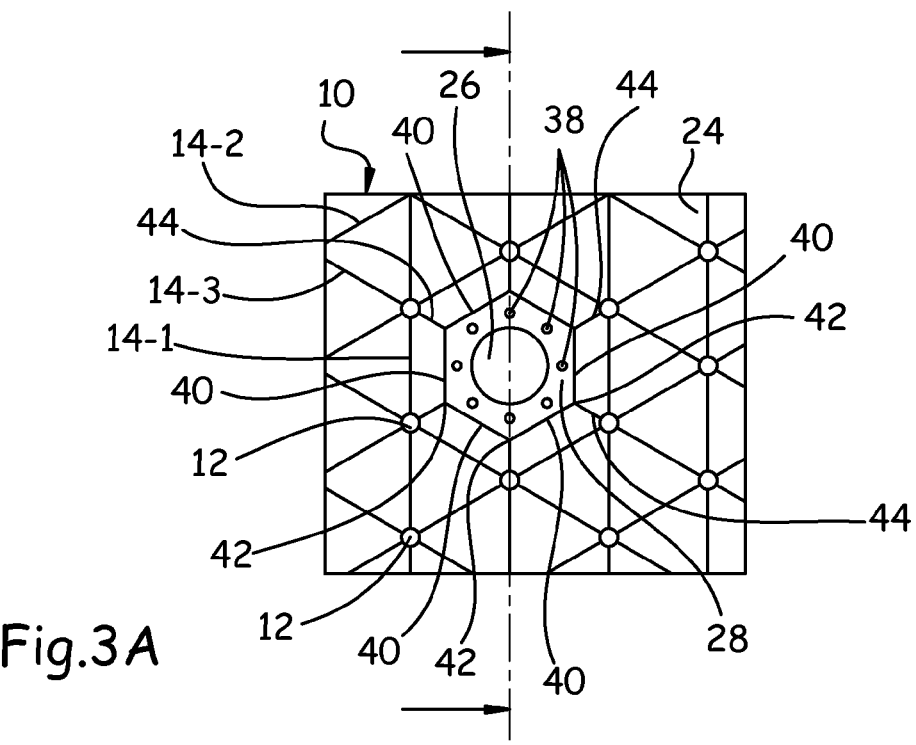
FIG. 3A is a front view of an "Isogrid"-type stiffened structure with an attachment ring of a pipe according to a first embodiment of the invention.

As illustrated in FIG. 1, a stiffened structure 10 comprises nodes 12 at which three stiffeners 14.1, 14.2, 14.3 of different directions intersect. Advantageously, the stiffeners are oriented in three directions that form an angle of 60° between one another. In this case, all of the meshes have the shape of an isosceles triangle. This structure is also known under the name of "Isogrid."

The stiffeners 14.1, 14.2, 14.3 are elements with a rectangular cross-section whose width is clearly less than the length. The edges of the stiffeners 14.1, 14.2, 14.3 are arranged in two parallel planes, with the surfaces of the stiffeners being arranged in planes that are perpendicular to the same plane.

Hereinafter, stiffener is defined as an element with an essentially rectangular cross-section whose width is clearly less than the length.

According to the variants, this stiffened structure may or may not be associated with at least one panel 24 that is fixed against the edges of the stiffeners 14.1, 14.2, 14.3.

This stiffened structure can be metal or made of any other material, such as composite material, for example.

This stiffened structure is not presented in more detail because it is known to one skilled in the art.

According to the variants that are illustrated in FIGS. 3A, 3B, 4 to 6, the stiffened structure 10 comprises at least one opening 26.

Figure 3B:
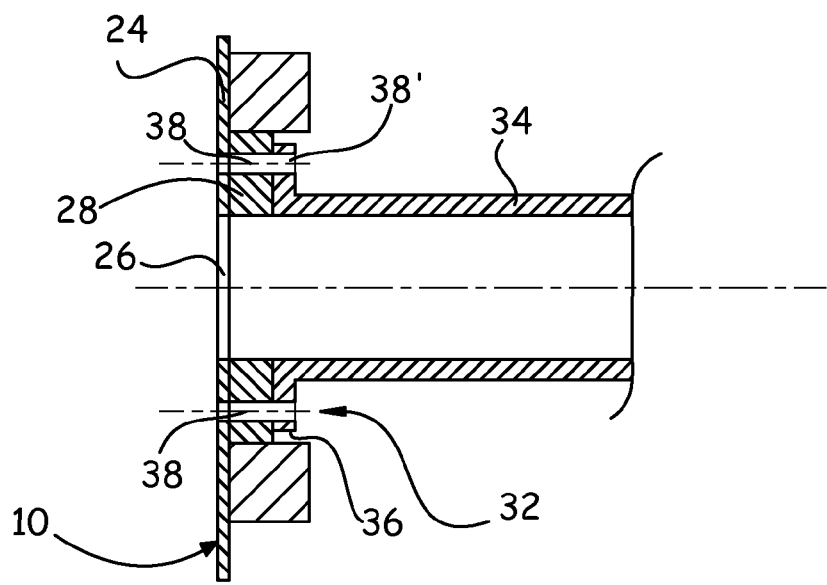
FIG. 3B is a cutaway of the stiffened structure of FIG. 3A to which a pipe is connected.
Figure 4:
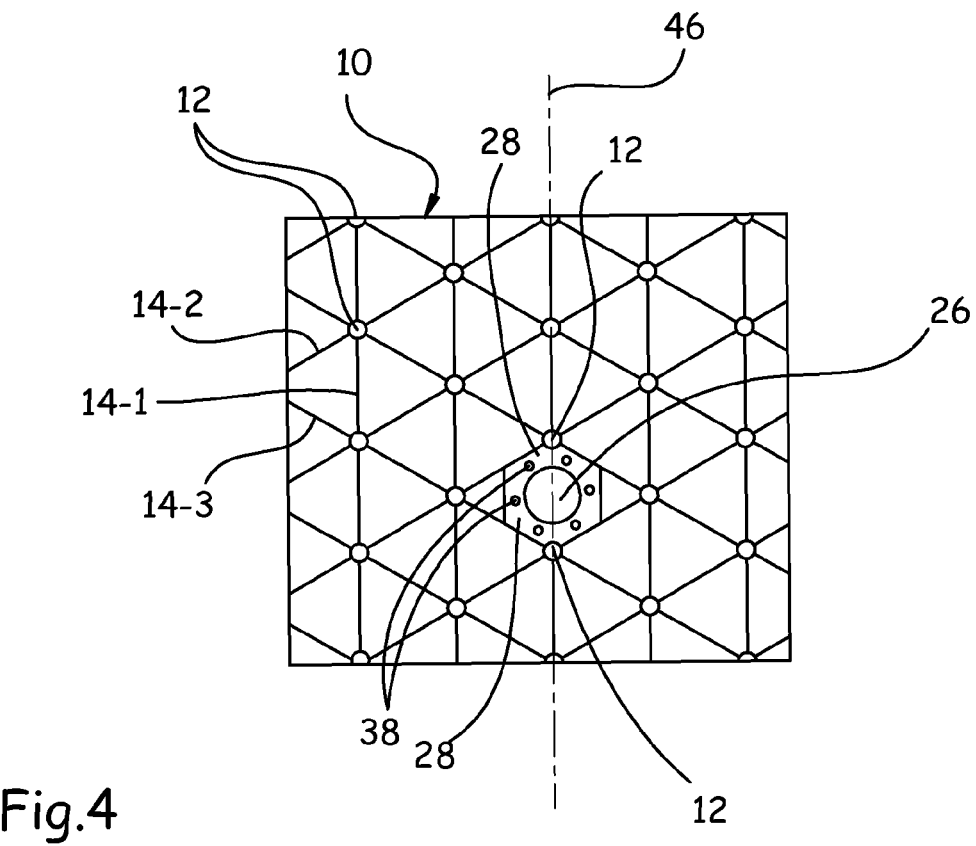
FIG. 4 is a front view of an "Isogrid"-type stiffened structure with an attachment ring of a pipe according to another variant of the invention.

According to the variants that are illustrated in FIGS. 3A, 3B and 4, the stiffened structure 10 comprises a wall 28 in which the opening 26 is made, and said opening has a circular shape, with this wall comprising means 32 for attachment of at least one pipe 34 that empties out at the opening 26.

In general, this wall 28 is arranged in a plane that is perpendicular to the stiffeners. It is sized, in particular its thickness, for ensuring the transmission of forces between the pipe 34 and the stiffened structure 10.

According to one embodiment that is illustrated in FIG. 3B, the pipe 34 comprises—at its end—a collar 36 with a front surface that is flattened against one of the surfaces of the wall 28.

According to one application, the wall 28 can be inserted between two pipes that are placed end to end, with the opening 26 ensuring the continuity between the inside of the two pipes. According to another application that is illustrated in FIG. 3B, the end of a single pipe is flattened against one of the surfaces of the wall 28.

According to one embodiment, the attachment means 32 can come in the form of bolts or rivets that pass through the wall 28 and the collar(s) 36 of the pipe(s) via, respectively, holes 38 that are made in the wall and holes 38' that are made in the collar(s) 36. The connecting means 32 are arranged between the opening 26 and the hexagonal belt that is formed by the peripheral stiffeners 40.

The attachment means, the pipes, are not presented in more detail because they can assume numerous configurations.

According to the invention, the wall 28 has a hexagonal peripheral shape and comprises—on the periphery—peripheral stiffeners 40, one for each side of the hexagonal shape, connected two by two.

Preferably, the peripheral stiffeners 40 have the same cross-section as the stiffeners 14.1, 14.2, 14.3 of the stiffened structure 10. The peripheral stiffeners are preferably arranged in the three directions of the stiffeners 14.1, 14.2, 14.3 of the stiffened structure 10.

According to a first variant, illustrated in FIG. 3A, adapted when the d/a ratio is greater than or equal to 1 (with d being the diameter of the opening 26 and a being the size of the mesh or the length of a stiffener 14.1, 14.2, 14.3 between two nodes 12), the peripheral stiffeners 40 are separate from the stiffeners 14.1, 14.2, 14.3 of the stiffened structure 10. In this case, each junction 42 of the peripheral stiffeners 40 is connected to the adjacent node 12 by a secondary stiffener 44. Advantageously, the secondary stiffeners 44 have the same cross-section as the stiffeners 14.1, 14.2, 14.3 of the stiffened structure 10.

According to this variant, the peripheral stiffeners advantageously have the same length.

According to the position of the opening 26, the secondary stiffeners 44 may or may not be aligned with the stiffeners 14.1, 14.2, 14.3 of the stiffened structure 10.

According to another variant, illustrated in FIG. 4, adapted when the ratio d/a is less than 1, at least some peripheral stiffeners are stiffeners 14.1, 14.2, 14.3 of the stiffened structure 10.

As illustrated in FIG. 4, four peripheral stiffeners are parts of stiffeners of the structure that are connected two by two at nodes 12 arranged on either side of the opening 26, with the pairs of parts of stiffeners being connected by two specific peripheral stiffeners 40 that are separate from the stiffeners 14.1, 14.2, 14.3 of the stiffened structure 10. The two stiffeners 40 are parallel and preferably arranged symmetrically relative to the axis 46 that connects the nodes 12 at which the stiffeners 14.1, 14.2, 14.3 of the stiffened structure 10, used as peripheral stiffeners, intersect.

In this case, the peripheral stiffeners 40 do not necessarily form an isosceles hexagon.

Figure 5:
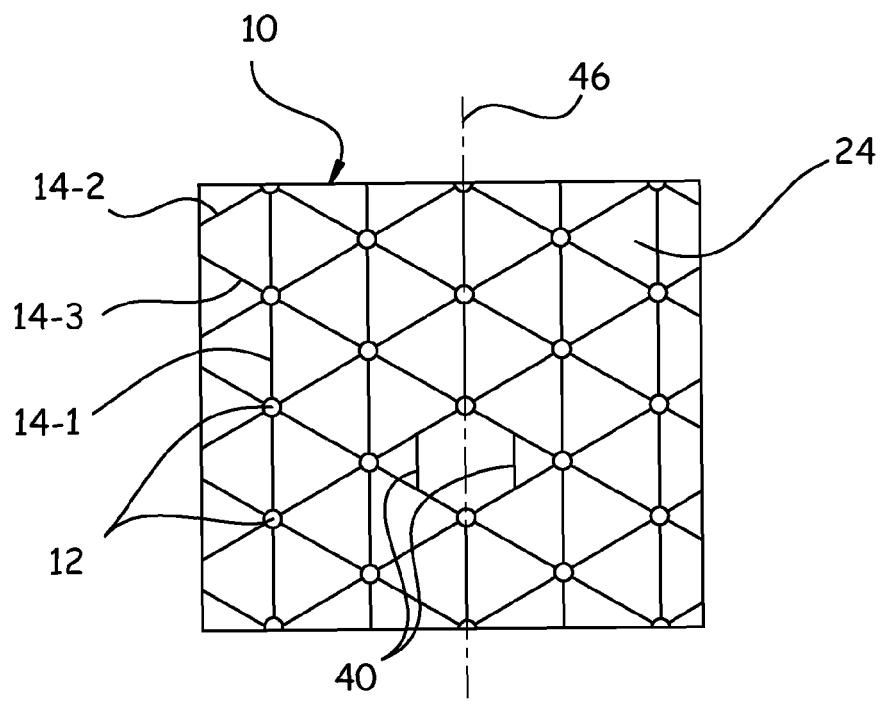
FIG. 5 is a front view of an "Isogrid"-type stiffened structure with an opening according to a first variant of the invention.
Figure 6:
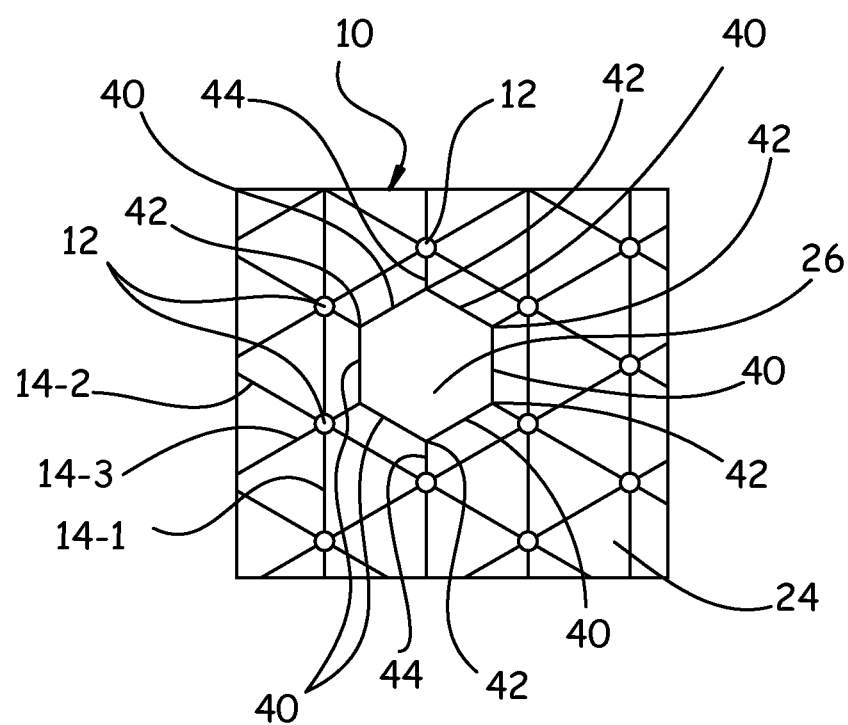
FIG. 6 is a front view of an "Isogrid"-type stiffened structure with an opening according to another variant of the invention.

According to other variants that are illustrated in FIGS. 5 and 6, the opening 26 may allow the passage of a pipe that is not connected to the stiffened structure or link the two zones that are separated by a panel 24 that is associated with the stiffened structure.

According to these variants, the opening 26 is delimited by peripheral stiffeners 40 that form a hexagon.

According to another variant, illustrated in FIG. 6, adapted when the ratio d/a is less than 1, at least certain peripheral stiffeners are stiffeners 14.1, 14.2, 14.3 of the stiffened structure 10.

As illustrated in FIG. 5, four peripheral stiffeners are parts of stiffeners of the structure connected two by two at nodes 12 that are arranged on either side of the opening 26, with the pairs of parts of stiffeners being connected by two specific peripheral stiffeners 40 that are separate from the stiffeners 14.1, 14.2, 14.3 of the stiffened structure 10. The two stiffeners 40 are parallel and preferably arranged in a symmetrical manner relative to the axis 46 that connects the nodes 12 at which the stiffeners 14.1, 14.2, 14.3 of the stiffened structure 10, used as peripheral stiffeners, intersect.

In this case, the peripheral stiffeners 40 do not necessarily form an isosceles hexagon.

According to a variant, illustrated in FIG. 6, adapted when the ratio d/a is greater than or equal to 1 (with d being the diameter of the opening 26 and a being the size of the mesh or the length of a stiffener 14.1, 14.2, 14.3 between two nodes 12), the peripheral stiffeners 40 are separate from the stiffeners 14.1, 14.2, 14.3 of the stiffened structure 10. In this case, each junction 42 of the peripheral stiffeners 40 is connected to the adjacent node 12 by a secondary stiffener 44. Advantageously, the secondary stiffeners 44 have the same cross-section as the peripheral stiffeners 40.

According to this variant, the peripheral stiffeners advantageously have the same length.

According to the position of the opening 26, the secondary stiffeners 44 may or may not be aligned with the stiffeners 14.1, 14.2, 14.3 of the stiffened structure 10.

According to all of the variants, the opening 26 is surrounded by peripheral stiffeners 40 that form a hexagonal belt that delimits the opening 26, as illustrated in FIGS. 5 and 6, or that stiffens a wall 28 in which the opening 26 is made, as illustrated in FIGS. 3B and 4. The presence of secondary stiffeners 44 and their arrangements around the opening 26 can be based on the ratio d/a and/or the position of the peripheral stiffeners 40 relative to the other stiffeners 14.1, 14.2, 14.3 of the stiffened structure 10.

The invention claimed is:

1. Stiffened structure, comprising:
primary stiffeners (14.1, 14.2, 14.3) located on a panel (24);

nodes (12) located where three primary stiffeners (14.1, 14.2, 14.3) of different directions intersect, with surfaces of the three primary stiffeners (14.1, 14.2, 14.3) being arranged in planes that are perpendicular to a same plane of the panel (24);

at least one opening (26);

peripheral stiffeners (40) located on the panel (24), each of the peripheral stiffeners (40) running in a same direction as a adjacent one of the primary stiffeners (14.1, 14.2, 14.3); and a hexagonal belt formed, at least in part, by the peripheral stiffeners (40), the hexagonal belt surrounding said at least one opening (26) and having an inside surface facing the one opening (26).

2. Stiffened structure according to claim 1, further comprising:

secondary stiffeners (44), the secondary stiffeners (44) each having lengthwise edges and distal end edges, wherein, the peripheral stiffeners (40) are separate from the primary stiffeners (14.1, 14.2, 14.3), and the peripheral stiffeners (40) are fixed against the end edges of the secondary stiffeners (44) with each junction corner (42) of two peripheral stiffeners (40) being connected to an adjacent node (12) by one said secondary stiffener (44).

3. Stiffened structure according to claim 2, wherein the peripheral stiffeners (40) have the same length.

4. Stiffened structure according to claim 2, wherein the secondary stiffeners (44) have the same cross-section as the peripheral stiffeners (40).

5. Stiffened structure according to claim 2, wherein the secondary stiffeners (44) are aligned with the primary stiffeners (14.1, 14.2, 14.3).

6. Stiffened structure according to claim 1, wherein the peripheral stiffeners have the same cross-section as the primary stiffeners (14.1, 14.2, 14.3).

7. Stiffened structure according to claim 1, wherein the opening (26) is formed from a wall (28) stiffened by the hexagonal belt.

8. Stiffened structure according to claim 7, further comprising pipe-connecting means (32) arranged through the wall (28) between the opening (26) and the hexagonal belt.

9. Stiffened structure according to claim 8, further comprising a pipe (34) with a collar (36) attached to the wall (28), and wherein the collar (36) of the pipe (34) and the wall (28) comprise aligned holes, and pipe-connecting means (32) pass through the aligned holes in the wall (28) and the collar (36) of the pipe (34) to attach the pipe (34) to the wall (28).

10. Stiffened structure according to claim 3, wherein the secondary stiffeners (44) are aligned with the primary stiffeners (14.1, 14.2, 14.3).

11. Stiffened structure according to claim 4, wherein the secondary stiffeners (44) are aligned with the primary stiffeners (14.1, 14.2, 14.3).

12. Stiffened structure according to claim 9, wherein the secondary stiffeners (44) are aligned with the primary stiffeners (14.1, 14.2, 14.3).

13. Stiffened structure according to claim 1, wherein, the peripheral stiffeners (40) are surrounded by the primary stiffeners such that the primary stiffeners and the nodes form an outer hexagonal belt surrounding the hexagonal belt, and further comprising (26) secondary stiffeners (44), the hexagonal belt being connected to the nodes of the outer hexagonal belt via the secondary stiffeners (44).

14. Stiffened structure according to claim 1, further comprising:

a further hexagonal belt located around said hexagonal belt, said further hexagonal belt being comprised of a pairs of said primary stiffeners (14.1, 14.2, 14.3) connected at respective ones of said nodes (12); and secondary stiffeners (44) extending toward said nodes (12) of said further hexagonal belt to a corresponding junction corner (42) of two peripheral stiffeners (40) forming said hexagonal belt.

15. Stiffened structure according to claim 1, wherein, the opening (26) is formed from a wall (28) stiffened by the hexagonal belt, the opening (26) being inside the hexagonal belt, and further comprising a pipe (34) with a collar (36) attached to the wall (28) with connectors, wherein, wherein the wall (28) and the collar (36) of the pipe (34) each comprise aligned holes in the wall (28), and the connectors pass through the aligned holes in the wall (28) and the collar (36) of the pipe (34) to thereby attach the pipe (34) to the wall (28) within the hexagonal belt.

16. Stiffened structure, comprising:

a panel (24);

primary stiffeners (14.1, 14.2, 14.3) located on the panel, each primary stiffener having lengthwise edges and distal end edges;

nodes (12) located where three primary stiffeners (14.1, 14.2, 14.3) of different directions intersect, with surfaces of the three primary stiffeners (14.1, 14.2, 14.3) being arranged in planes that are perpendicular to a plane of the panel; and two peripheral stiffeners (40), each peripheral stiffener having lengthwise edges and distal end edges, a first distal end edge of a first of peripheral stiffeners being fixed to a side of a first of the primary stiffeners and an opposite, second distal end edge of the first of peripheral stiffeners being fixed to a side of a second of the primary stiffeners, a first distal end edge of a second of peripheral stiffeners being fixed to a side of a third of the primary stiffeners and an opposite, second distal end edge of the second of peripheral stiffeners being fixed to a side of a fourth of the primary stiffeners, wherein the lengthwise edges of the first and second peripheral stiffeners and the first, second, third, and fourth primary stiffeners define an opening (26) with a hexagonal shape.

17. Stiffened structure according to claim 16, wherein the hexagonal shape comprising two pairs of parts of primary stiffeners (14.1, 14.2, 14.3), with the pairs of parts of primary stiffeners being connected by the two peripheral stiffeners (40) that are separate from the primary stiffeners (14.1, 14.2, 14.3).

18. Stiffened structure, comprising:

a panel (24);

primary stiffeners (14.1, 14.2, 14.3) located on the panel, each primary stiffener having lengthwise edges and distal end edges;

nodes (12) located where three primary stiffeners (14.1, 14.2, 14.3) of different directions intersect, with surfaces of the three primary stiffeners (14.1, 14.2, 14.3) being arranged in planes that are perpendicular to a plane of the panel;

secondary stiffeners (44) located on the panel, each secondary stiffener having lengthwise edges and distal end edges, a first end edge of each secondary stiffener being fixed to one of said nodes; and peripheral stiffeners (40), each peripheral stiffener having lengthwise edges and distal end edges, the peripheral stiffeners being connected end edge-to-end edge to thereby define an opening (26) with a hexagonal shape, wherein a second end edge of each secondary stiffener is fixed to one corner of the hexagonal shape where two adjacent peripheral stiffeners are connected end edge-to-end edge.

\* \* \* \* \*